United States Patent
Huang et al.

(10) Patent No.: US 8,659,891 B2
(45) Date of Patent: Feb. 25, 2014

(54) HEAT DISSIPATION SYSTEM

(75) Inventors: Hua Huang, Shenzhen (CN);
Xiang-Kun Zeng, Shenzhen (CN);
Zhi-Jiang Yao, Shenzhen (CN); Li-Fu Xu, Shenzhen (CN)

(73) Assignees: Hong Fu Jin Precision Industry (ShenZhen) Co., Ltd, Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 319 days.

(21) Appl. No.: 13/095,868

(22) Filed: Apr. 28, 2011

(65) Prior Publication Data

US 2012/0140405 A1 Jun. 7, 2012

(30) Foreign Application Priority Data

Dec. 6, 2010 (CN) .......................... 2010 1 0574885

(51) Int. Cl.
*H05K 7/20* (2006.01)
(52) U.S. Cl.
USPC ................... 361/679.51; 361/679.5; 361/693; 361/709; 361/720; 454/184
(58) Field of Classification Search
USPC ....................... 361/679.46–679.54, 688–697, 361/701–704, 707, 709–710, 717–722, 760
See application file for complete search history.

(56) References Cited

U.S. PATENT DOCUMENTS

| | | | |
|---|---|---|---|
| 5,793,608 A * | 8/1998 | Winick et al. | 361/695 |
| 7,403,387 B2 * | 7/2008 | Pav et al. | 361/694 |
| 8,248,783 B2 * | 8/2012 | Huang | 361/679.5 |
| 2002/0134531 A1 * | 9/2002 | Yanagida | 165/80.3 |
| 2003/0076652 A1 * | 4/2003 | Ahn | 361/683 |
| 2005/0168940 A1 * | 8/2005 | Askeland et al. | 361/687 |
| 2006/0120001 A1 * | 6/2006 | Weber et al. | 361/103 |
| 2007/0058339 A1 * | 3/2007 | Hoffman et al. | 361/688 |
| 2007/0133167 A1 * | 6/2007 | Wagner et al. | 361/687 |
| 2007/0201205 A1 * | 8/2007 | Holmes et al. | 361/695 |
| 2011/0141688 A1 * | 6/2011 | Li et al. | 361/679.51 |

* cited by examiner

*Primary Examiner* — Courtney Smith
(74) *Attorney, Agent, or Firm* — Altis Law Group, Inc.

(57) ABSTRACT

A heat dissipation system includes a computer case has a base plate and a back plate, a heat sink, a second heat source, and an air partition panel. The back plate defines a plurality of first air outlet holes aligned with the heat sink, and a plurality of second air outlet holes aligned with the second heat source. The heat sink is positioned on the base plate in contact with a first heat source. The second heat source is positioned on the base plate adjacent to the base plate. The air partition panel is positioned on the base plate between the motherboard and the second heat source. A first air path is defined between the air partition panel and the plurality of first air outlet holes. A second air path is defined between the air partition panel and the plurality of second air outlet holes.

14 Claims, 3 Drawing Sheets

HEAT DISSIPATION SYSTEM

BACKGROUND

1. Technical Field

The disclosure generally relates to a heat dissipation system, and especially to a heat dissipation system for improving heat dissipation efficiency of a power supply in computer system.

2. Description of Related Art

All-in-One computers are desktop computers that combine the monitor into the same case as the CPU. A typical all-in-one computer includes a motherboard and a cooling fan. A plurality of heat sources (e.g., CPU, north bridge chip, south bridge chip) are attached on the motherboard. Thus, the cool air from outside of the computer flows through the heat sources is blown out by the cooling fan fixed to a power supply in the computer. However, the cool air heated by the heat sources is mainly blown out of the computer by the cooling fan via the power supply. A temperature on the power supply is largely increased and may cause the power supply been damaged.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
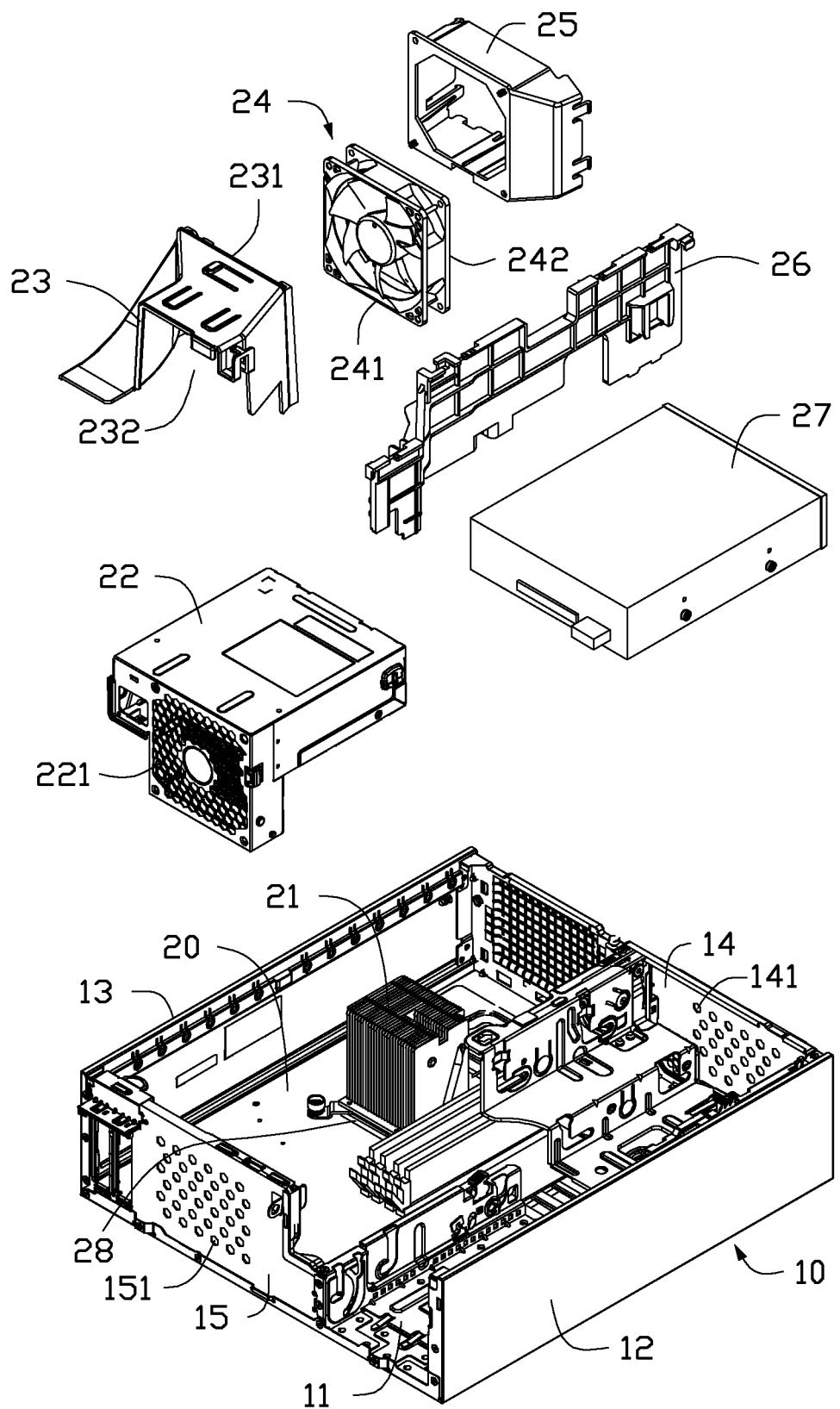
FIG. 1 is an exploded view of an embodiment of a heat dissipation system.
Figure 3:
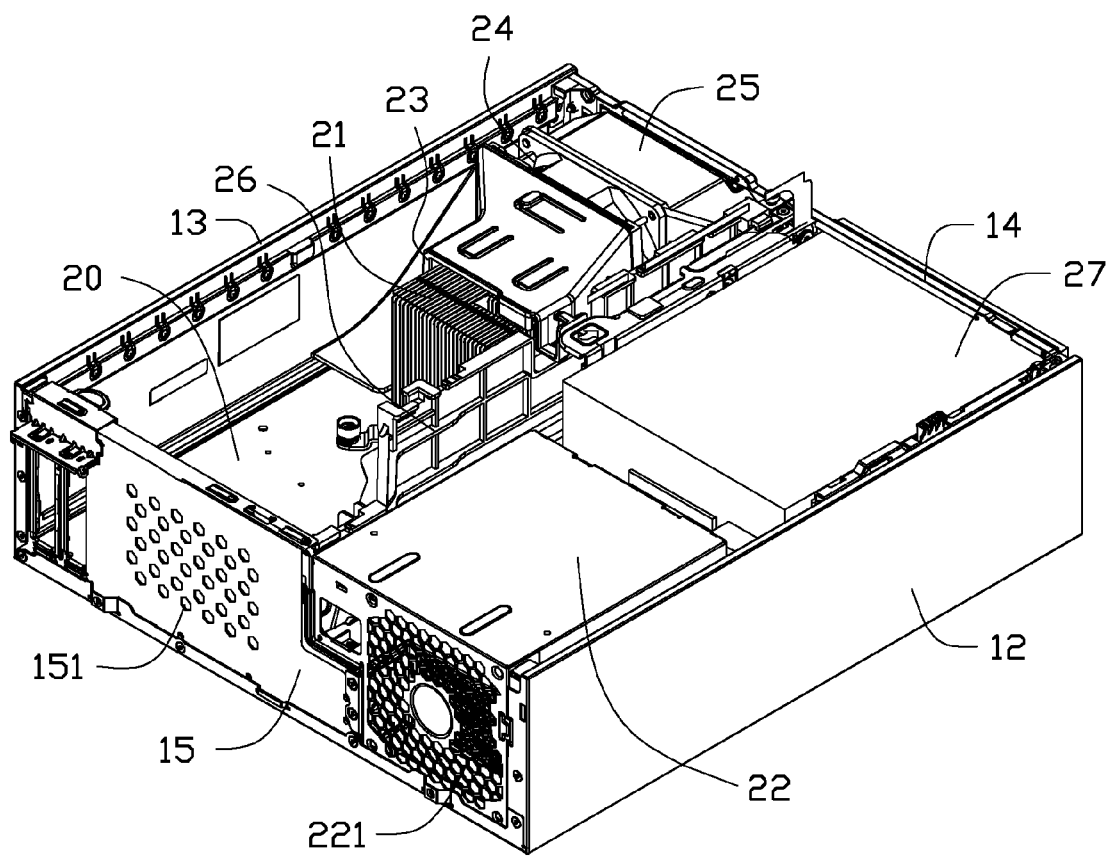
FIG. 3 is an assembled view of the heat dissipation system shown in FIG. 1.

Referring to FIGS. 1 and 3, a heat dissipation system for a computer case 10 includes a base plate 11, a first side plate 12, a second side plate 13, a front plate 14, and a back plate 15. The first side plate 12, the second side plate 13, the front plate 14, and the back plate 15 are perpendicular to the base plate 11.

The base plate 11 has a motherboard 20 attached. The motherboard 20 is installed with a first heat source 28. A heat sink 21 is positioned on the first heat source 28. An air outlet duct 23 fixed to one side of the heat sink 21 adjacent to the front plate 14, a fan 24, and an air inlet duct 25. The air outlet duct 23 includes an air inlet opening 231 and an air outlet opening 232. The air outlet opening 232 is in communication with the heat sink 21. The fan 24 includes a first side 241 and a second side 242. The air inlet opening 231 is in communication with the first side 241 of the fan 24. The air inlet duct 25 is fixed to the second side 242 of the fan 24. The fan 24 communicates with outside of the computer case 10 via the air inlet duct 25 and the cool air from outside is sucked into the computer case 10.

The base plate 11 is installed with a second heat source 22 and an ODD (Optical Disk Driver) 27 adjacent to the motherboard 20. The second heat source 22 is positioned on the base plate 11 adjacent to the back plate 15. The ODD 27 is positioned on the base plate 11 adjacent to the front plate 14. A plurality of air inlet holes 141 are defined on the front plate 14. A plurality of first air outlet holes 151 is defined on the back plate 15. A plurality of second air outlet holes 221 is defined on a back of the second heat source 22. An air partition panel 26 is positioned on the base plate 11 between the second heat source 22 and the motherboard 20. The cool air from outside flows through the heat sink 21 is blown out of the computer case 10 via the plurality of first air outlet holes 151. The cool air from outside flows through the second heat source 22 is blown out of the computer case 10 via the plurality of second air outlet holes 221.

Figure 2:
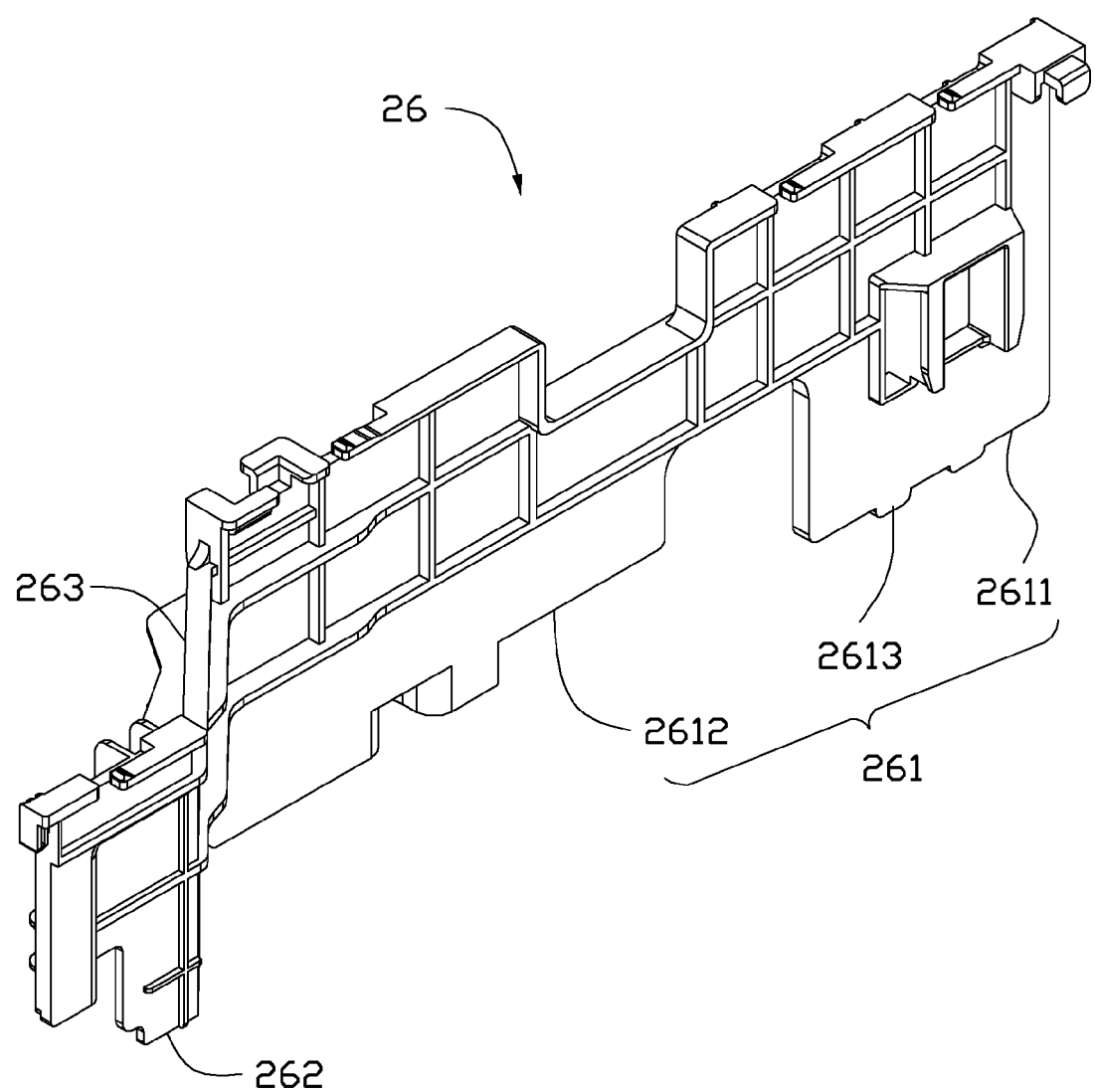
FIG. 2 is an isometric view of the heat dissipation system of FIG. 1.

Referring to FIG. 2, the air partition panel 26 includes a first air partition portion 261, a second air partition portion 262, and a bending portion 263 connected between the first air partition portion 261 and the second air partition portion 262. The first air partition portion 261 includes a first portion 2611 and a second portion 2612 connected to the first portion 2611. A plurality of engaging portions 2613 protrudes from a bottom edge of the first portion 2611 for engaging with the base plate 11. The second portion 2612, the bending portion 263, and the second air partition portion 262 are positioned on the motherboard 20. A first air path (not labeled) is defined between the air partition panel 26 and the plurality of first air outlet holes 151. The first air path is configure to direct airflow toward the first heat source 28 and out of the computer case 10 via the plurality of first air outlet holes 151. A second air path (not labeled) is defined between the air partition panel 26 and the plurality of second air outlet holes 221. The second air path is configure to direct airflow toward the second heat source 22 and out of the computer case 10 via the plurality of second air outlet holes 221. In one embodiment, a height of the first portion 2611 is greater than that of the second portion 2612, the bending portion 263, and the second air partition portion 262. The first heat source 28 and the heat sink 21 are adjacent to the first air partition portion 261. The second heat source 22 is adjacent to the second air partition portion 262. In one embodiment, the first heat source 28 is a CPU. The second heat source 22 is a power supply accommodating a cooling fan (not shown) therein.

In use, the fan 24 and the cooling fan rotate to work. The cool air from outside is sucked into the computer case 10 via the air inlet duct 25. A speed of the cool airflow is accelerated when passing through the air outlet duct 23 and the fan 24. The cool air displaces the warm air heated by the heat sink 21. The warm air is blown out of the computer case 10 by the fan 24 via the plurality of first air outlet holes 151 on the back plate 15. At the same time, the cool air outside the computer case 10 is sucked into the computer case 10 via the plurality of air inlet holes 141 on the front plate 14. The cool air displaces the warm air heated by the second heat source 22. The warm air is blown out of the computer case 10 by the cooling fan in the second heat source 22 via the plurality of second air outlet holes 221 on the second heat source 22. The warm air heated by the heat sink 21 and the second heat source 22 can be propelled out of the computer case 10 via separated air channels and air outlets. Therefore, interference of airflow in the computer case 10 can be avoided, and a temperature on the second heat source 22 is decreased.

Using a software application called Icepak to simulate the efficiency of the heat dissipation system, the following results of an embodiment shown below were obtained. The simulated conditions are set to: initial ambient temperature 35 degrees Celsius. A power dissipation of the first heat source 28 is 65 W. A power dissipation of the second heat source 22 is 240 W. The heat sink 21 has a dimension of 85.3 millimeter (mm)×81 mm×87.7 mm (length×width×height). The fan 24 has a dimension of 92 mm×92 mm×25 mm (length×width×height). A maximum air flow rate of the fan 24 is 35.32 cubic feet per minute (cfm). A rated speed of the fan 24 is 2000 revolutions per minute (rpm). The simulation according to the set conditions shows that the maximum temperature on the second heat source 22 is 50.60 degrees Celsius when the heat dissipation system of the disclosure, and 58.85 degrees Celsius when using a common heat dissipation system.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation system comprising:
a computer case comprising a base plate, a front plate and a back plate; wherein the front plate and the back plate are perpendicular to the base plate; wherein the base plate is attached to a motherboard;
a heat sink positioned on the motherboard, in contact with a first heat source; wherein the heat sink and the first heat source are adjacent to the front plate; the back plate defines a plurality of first air outlet holes aligned with the heat sink;
a second heat source positioned on the base plate adjacent to the back plate; wherein the back plate defines a plurality of second air outlet holes aligned with the second heat source; and
an air partition panel positioned on the base plate between the motherboard and the second heat source; wherein a first air path is defined between the air partition panel and the plurality of first air outlet holes; the first air path directs airflow toward the first heat source and out of the computer case via the plurality of first air outlet holes; a second air path is defined between the air partition panel and the plurality of second air outlet holes; and the second air path directs airflow toward the second heat source and out of the computer case via the plurality of second air outlet holes; wherein the air partition panel comprises a first air partition portion, a second air partition portion, and a bending portion connected between the first air partition portion and the second air partition portion.

2. The heat dissipation system of claim 1, wherein the first air partition portion comprises a first portion engaged with the base plate, and a second portion connected to the first portion; the second portion, the bending portion, and the second air partition portion are positioned on the motherboard.

3. The heat dissipation system of claim 2, wherein a height of the first portion is greater than that of the second portion, the bending portion, and the second air partition portion.

4. The heat dissipation system of claim 1, further comprising an air outlet duct fixed to one side of the heat sink adjacent to a front plate; the air outlet duct includes an air inlet opening and an air outlet opening; the air inlet opening is in communication with a fan; and the air outlet opening is in communication with the heat sink.

5. The heat dissipation system of claim 4, further comprising an air inlet duct; the fan comprises a first side and a second side; the air inlet opening communicates with the first side of the fan; and the air inlet duct is fixed to the second side of the fan.

6. The heat dissipation system of claim 5, wherein the first heat source and the heat sink are adjacent to the first air partition portion; and the second heat source is adjacent to the second air partition portion.

7. The heat dissipation system of claim 5, wherein the first heat source is a CPU; and the second heat source is a power supply.

8. A heat dissipation system comprising:
a computer case comprising a base plate and a back plate perpendicular to the base plate;
a heat sink positioned in the computer case in contact with a first heat source; wherein the back plate defines a plurality of first air outlet holes aligned with the heat sink;
a second heat source positioned on the base plate adjacent to the first heat source and the heat sink; wherein the back plate defines a plurality of second air outlet holes aligned with the second heat source; and
an air partition panel positioned on the base plate between the first heat source, the heat sink and the second heat source; wherein a first air path is defined between the air partition panel and the plurality of first air outlet holes; the first air path directs airflow toward the first heat source and out of the computer case via the plurality of first air outlet holes; a second air path is defined between the air partition panel and the plurality of second air outlet holes; and the second air path directs airflow toward the second heat source and out of the computer case via the plurality of second air outlet holes; wherein the air partition panel comprises a first air partition portion, a second air partition portion, and a bending portion connected between the first air partition portion and the second air partition portion.

9. The heat dissipation system of claim 8, wherein the base plate is attached to a motherboard; the heat sink is positioned on the motherboard; and the air partition panel is positioned on the base plate between the motherboard and the second heat source.

10. The heat dissipation system of claim 9, wherein the first air partition portion comprises a first portion engaged with the base plate, and a second portion connected to the first portion; the second portion, the bending portion, and the second air partition portion are positioned on the motherboard.

11. The heat dissipation system of claim 10, wherein a height of the first portion is greater than that of the second portion, the bending portion, and the second air partition portion.

12. The heat dissipation system of claim 8, further comprising an air outlet duct fixed to one side of the heat sink adjacent to a front plate; the air outlet duct includes an air inlet opening and an air outlet opening; the air inlet opening is in communication with a fan; and the air outlet opening is in communication with the heat sink.

13. The heat dissipation system of claim 12, further comprising an air inlet duct; the fan comprises a first side and a second side; the air inlet opening communicates with the first side of the fan; and the air inlet duct is fixed to the second side of the fan.

14. The heat dissipation system of claim 13, wherein the first heat source and the heat sink are adjacent to the first air partition portion; and the second heat source is adjacent to the second air partition portion.

* * * * *